June 7, 1966     H. M. BAKER, JR     3,254,666
TEMPERATURE RESTRAINED PRESSURE RELIEF DEVICE AND
METHOD FOR RELIEVING PRESSURE OF A FLUID
CONFINED WITHIN A VESSEL
Filed March 29, 1962
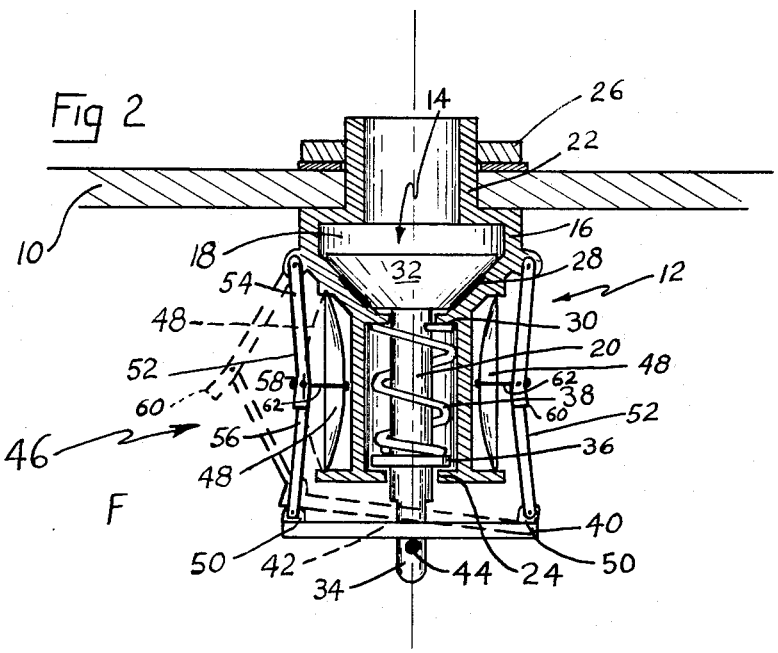
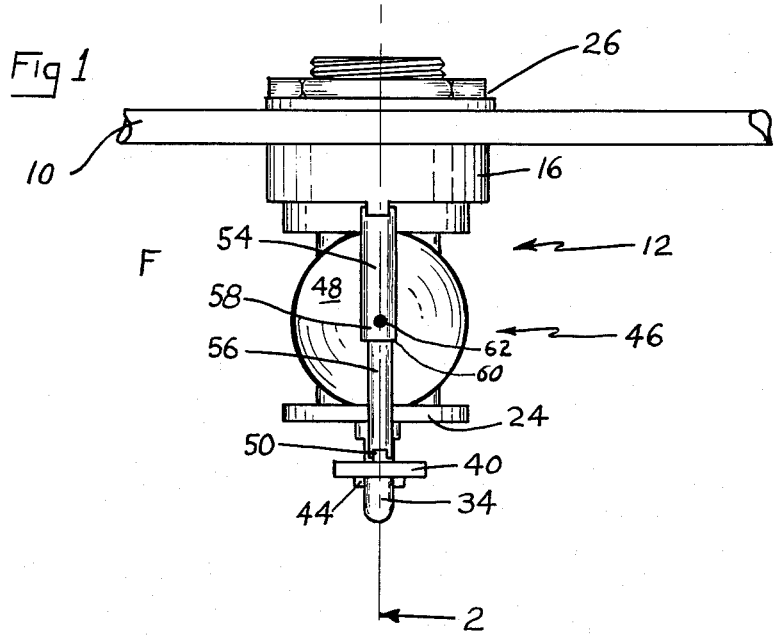
INVENTOR.
Hugh M. Baker Jr.
BY
ATTY.

United States Patent Office 3,254,666
Patented June 7, 1966

3,254,666
TEMPERATURE RESTRAINED PRESSURE RELIEF DEVICE AND METHOD FOR RELIEVING PRESSURE OF A FLUID CONFINED WITHIN A VESSEL
Hugh M. Baker, Jr., P.O. Box 41, Kensington, Md.
Filed Mar. 29, 1962, Ser. No. 183,664
12 Claims. (Cl. 137—467)

This invention relates to a pressure relief device and a method for relieving pressure of a fluid which may be confined within a vessel and more particularly to a device and a method for relieving fluid pressure wherein the device is responsive and operable only under a combination of certain required predetermined temperature and pressure conditions or values which must exist simultaneously before fluid pressure relief will occur.

There now exists a definite undesirable situation or problem which relates to the explosion of aircraft tires in the service area of the aircraft with such explosion of the tires being due to excessive braking of the aircraft during landing or taxiing which causes an undesirable temperature and pressure buildup of the fluid which is confined within the carcass of the aircraft tire. Such explosiions may occur sometime after the employment of the brakes of the aircraft due to the normal thermal lag between the brake and wheel assembly and the tire casing and the enclosed entrapped fluid, normally air. The excessive rise in temperature causes deterioration to the carcass or casing of the tire and the pressure buildup of the entrapped fluid which accompanies the increase in temperature leads to the delayed explosion of the aircraft tire.

Such explosion of aircraft tires is not only a serious hazard to the personnel and equipment in the immediate vicinity of the explosion but is also a danger to the aircraft itself. Also, while such aircraft tire explosions usually are delayed, it is also possible that the aircraft tire may explode during or shortly after landing or takeoff, especially if the aircraft is engaged in "touch-and-go" practice. In certain situations, it is also possible that on takeoff, such aircraft tire explosions will occur shortly after the aircraft has left the ground which will create a danger and hazard of the pilot having to land the aircraft without a tire.

A conventional type pressure relief valve, i.e., a valve which is responsive to a buildup in fluid pressure which will relieve the pressure when a certain value is reached, is not a satisfactory solution due to the high force of impact which occurs in aircraft during the landing thereof. An aircraft tire having a conventional pressure relief valve, set to relieve the pressure of the tire at a certain pressure value, may be indavertently or accidentally actuated to relieve the tire pressure in response to a sharp pressure increase caused by landing of the aircraft which will result in an undesired, softened condition in the tire.

Also, a thermally actuated relief valve is unsatisfactory in solving the difficulties that currently exist in the explosion of aircraft tires since there may be a brief and temporary rise in the temperature which would allow the fluid to escape even though there would not be any rise in the pressure of the fluid due to the temperature lag properties of the entrapped fluid, that is, the air which is confined within the tire casing.

At the present time, there is currently being employed, due to the severity of the problem, as described above, a fusible metal plug which is placed within the rim of the aircraft wheel or the side wall of the tire casing, as the case may be, with the metal plug being of a material that enables the plug to melt in response to a sufficient increase in the temperature of the entrapped fluid. Obviously, on application of the metal plug, the result of the melting thereof will be the complete dumping or relief of the fluid which is entrapped within the tire casing and the casing becomes flattened. While a fusible metal plug affords considerable protection to the personnel and equipment in the service area and the aircraft, the metal plug does not solve the danger or hazard of a flat tire during fast taxiing, landing, or takeoff of the aircraft if the fluid dumping occurs while the aircraft is airborne. Also, the metal plug solution normally results in damage to the extent of a complete loss of the aircraft tire even though the increase in the fluid temperature may not have lasted for a time sufficient to have caused deterioration to the tire casing. In addition, it is necessary that the aircraft wheel be dismantled in order to assemble and replace the metal plug as required.

Accordingly, it is an object of this invention to provide a fluid pressure relief device and method of relieving the pressure of a fluid which may be confined in a vessel of only the pressure which is in excess of a desired fluid pressure with the pressure relief of the entrapped fluid occurring only when the excess fluid pressure is accompanied by a temperature condition with the combined excess pressure and temperature conditions being of values which represent a danger or hazard that the vessel might explode.

It is also an object of this invention to provide a pressure relief device and method of relieving excessive air pressure from an aircraft tire which will enable the air pressure of the aircraft tire to be maintained at a safe value for landing and taxiing of the aircraft even though certain conditions of the aircraft tire may exceed the normal or usual safe values of such conditions.

It is a further object of this invention to provide a fluid pressure relief device and a method for relieving excessive air pressure of a pneumatic tire which is provided with self-resetting that does not require that the wheel and tire casing be dismantled to reset or replace the device after the device has functioned to relieve excessive pressure in the tire casing.

In order to overcome the disadvantages, eliminate the dangers and hazards, and accomplish the desired objects, as stated above, the pressure relief device and method of releasing excess pressure of a fluid which is confined within a vessel, the device of this invention includes thermo responsive structure which is normally operable to restrain the pressure relief device against releasing any of the fluid pressure of the fluid which is confined within the vessel until certain definite predetermined temperature and pressure conditions or values exist so that it is required that the combined predetermined temperature and pressure conditions or values actually, in fact, exist prior to the actuation of the device to enable the relief of the fluid pressure from the vessel. The thermo responsive structure in effect acts to restrain the device against the pressure relief of the fluid which is confined within the vessel until the required combination of predetermined temperature and pressure conditions or values exist. In this way, it is possible to control the pressure relief of the fluid which is confined within the vessel until the predetermined temperature condition exists simultaneously with an excessive fluid pressure value.

Other objects and important features of the invention will be apparent from a study of the specification following taken with the drawing which together show, illustrate, describe and disclose a preferred embodiment or modification of the invention and what is now considered to be the best mode of practicing the principles thereof. Other embodiments or modifications may be suggested to those having the benefit of the teachings herein and such other embodiments or modifications are intended to be reserved especially as they fall within the scope and spirit of the subjoined claims.

In the drawing:

FIGURE 1 is a side elevational view of a thermo restrained pressure relief device for relieving pressure of a fluid entrapped within the confines of a vessel to which the device is secured, and FIGURE 2 is a sectional view taken along the line 2—2 of FIGURE 1 looking in the direction of the arrows.

Attention is now directed to FIGURES 1 and 2 of the drawing wherein there is shown a part 10 of a vessel in which there may be entrapped a fluid F under pressure. The vessel 10 may take the form of a wheel assembly including a tire casing or carcass mounted on a wheel rim which may be in the preferable embodiment or modification a wheel assembly for an aircraft, not illustrated.

A thermo restrained fluid pressure relief device 12 which may take the form of poppet type valve structure 14 is provided as apparatus for relieving the pressure of the fluid F should such be in excess of a predetermined value provided that the temperature conditions of the vessel 10 are also equal to or greater than a predetermined value, as will be explained in more detail hereinafter, so that the device 12 will not act to relieve the pressure of the fluid F which is confined within the vessel 10 until the required combination of the predetermined temperature and pressure conditions or values exists substantially simultaneously.

The valve structure 14 includes an elongate substantially cylindrical open-ended body or housing 16 which defines a chamber 18 wherein there is disposed a valve poppet 20.

The body or housing 16 of the valve structure 14 has each end portion 22–24 thereof reduced with the one end portion 22 defining means for securing the valve structure 14 to the vessel 10 and, as illustrated in FIGURES 1 and 2 of the drawing, the end portion 22 may be externally threaded and secured to the vessel 10 by a conventional type of a nut-washer arrangement 26 with the remaining part of the body or housing 16 projecting into and terminating within the confines of the vessel 10.

The intermediate portion of the body or housing 16 is inclined to define a valve seat 28 which may be coated by a resilient material, such as neoprene or the like, as desired. An abutment 30 is provided adjacent the valve seat 28 in the body or housing 16 of the valve structure 14 for a purpose to be described in more detail hereinafter.

The valve poppet 20 is provided with an enlarged end portion 32 having a configuration corresponding to that of the valve seat 28 on the body or housing 16 for engagement therewith to create a seal against fluid flow of the entrapped fluid F from within the confines of the vessel 10 to atmosphere. The valve poppet 20 extends from the enlarged portion 32 through aligned openings in the body or housing 16 and terminates in a reduced end portion 34 which projects beyond the adjacent or other end portion 24 of the body or housing 16. An abutment 36 is provided intermediate the end portions 32 and 34 of the valve poppet 20 and a bias 38, preferably in the form of a coil spring, is disposed between and in engagement with the abutment 30 on the body or housing 16 and the abutment 36 on the valve poppet 20 in a manner which normally biases the valve poppet 20 in a direction to engage the enlarged end portion 32 of the valve poppet 20 with the valve seat 28 on the body or housing 16 of the valve structure 14.

The reduced end portion 34 of the elongate valve poppet 20 pivotally supports and carries an elongate member 40 preferably in the form of a bar-like element for restraining movement of the valve poppet 20 in a direction to open the valve structure 14 and to relieve the pressure of the fluid F which may be confined within the vessel 10 so that the restraining member 40 will normally maintain the enlarged end portion 32 of the valve poppet 20 in engagement with the valve seat 28 of the body or housing 16 should the pressure of the fluid F exceed a predetermined value. The elongate restraining member 40 is provided with an aperture 42 through which the reduced end portion 34 of the valve poppet 20 projects and means 44 in the form of an elongate pin is provided for maintaining the elongated restraining member 40 pivotally mounted to the reduced end portion 34 of the valve poppet 20.

Thermo responsive means or structure 46 is provided for effectively releasing the elongate restraining member 40 to enable the enlarged end portion 32 of the valve poppet 20 to disengage the valve seat 28 of the body or housing 16 and enable the valve structure 14 to relieve the pressure of the fluid F from within the confines of the vessel 10 should such pressure exceed a predetermined value which is sufficient to exert a force which will overcome that force which is normally exerted by the bias 38. As illustrated in the preferred embodiment or modification of the thermo restained fluid pressure relief device 12, the means or structure 46 may take the form of a pair of bimetallic discs 48, disposed to opposed sides of the body or housing 16 of the valve structure 14 within the confines of the vessel 10 with the discs 48 normally having a concave configuration under desired temperature conditions, as illustrated by solid lines in FIGURE 2 of the drawing, but which are also effective on an increase in temperature conditions above the predetermined value to deform to a convex configuration, as illustrated in dash lines of FIGURE 2 in the drawing. The thermo responsive discs 48 are currently commercially available, on the market, being manufactured by Spencer Manufacturing Company, of Racine, Wisconsin, and Stevens Manufacturing Co., Inc., of Mansfield, Ohio, and the discs 48 are not only affected by the temperature changes by the fluid F which is confined within the vessel 10, but are also affected by any temperature change in any structure associated therewith such as a wheel assembly, as the case may be.

Disposed between each of the thermo responsive discs 48 and the adjacent end portion 50 of the elongate restraining member 40 is a linkage assembly 52 which includes, as illustrated, in the preferred embodiment or modification of this invention, a first link 54 which is pivotally connected to the body or housing 16 of the valve structure 14 and a second link 56 which is pivotally connected to the adjacent end portion 50 of the elongate restraining member 40 with the first and second links 54 and 56 of each linkage assembly 52 being pivotally connected at a location 58 which normally is disposed in a position which will enable the respective thermo responsive disc 48 to engage the first and second links 54 and 56 on deformation of the thermo responsive disc 48 from the concave to the convex configuration and move the linkage assembly 52 to a position as illustrated in dash lines of FIGURE 2 in a manner which enables the restraining action of the elongate restraining member 40 to be released and enable the enlarged end portion 32 of the valve poppet 20 to be disengaged from the valve seat 28 of the body or housing 16, provided that the pressure of the fluid F is sufficient to overcome the force created by the bias 38 and enable the fluid pressure relief device 12 to relieve the pressure of the fluid F from within the confines of the vessel 10.

The linkage assemblies 52 are each proivded with a toggle arrangement 60 which, when the respective linkage assembly 52 is disposed in the normal position, as illustrated by solid lines in FIGURE 2 of the drawing, the toggle arrangement 60 will define and create a self-locking feature to restrain the linkage assembly 52 against further movement generally inwardly toward the disc 48 which is disposed adjacent thereto.

Extending between the linkage 58 on each of the linkage assemblies 52 and the adjacent disc 48 of the respective structure 46 is a connection 62, in the form of an elongate bodily rigid member which secures each of the linkage assemblies 52 and the respective structure 46 together to function and act as a reset means or device for repositioning the linkage assemblies 52 to the position as illustrated by solid lines on movement of the discs 48 from the deformed position as shown by dash lines in FIGURE 2 of the drawing.

From the above, it is believed that it will be readily understood that the fluid pressure relief device 12 is not responsive to only an increase in the pressure of the fluid F or an increase in the temperature conditions of the vessel 10 and fluid F but that there must be and that it is required that a combination of predetermined temperature and pressure conditions or values must be in existence before the fluid pressure relief device 12 will effectively relieve the pressure of the fluid F from within the confines of the vessel 10.

Should the pressure of the fluid F exceed the predetermined value thereof with the predetermined temperature condition not being in existence, which would normally enable a conventional type of valve structure to relieve such fluid, the valve poppet 20 will remain in closed position with the enlarged end portion 32 thereof in engagement with the valve seat 28 by reason of the elongate restraining member 40, linkage assemblies 52 and the concave configuration of the thermo responsive discs 48 even though such pressure value would normally be sufficient to overcome the force created by the bias 38 on the valve poppet 20. Also, should the temperature condition exceed the predetermined value with the pressure of the fluid F not exceeding the predetermined value by reason of the temperature lag normally associated in the environment of the vessel 10, the thermo responsive discs 48 will be deformed into engagement with the associated linkage assemblies 52 which will release the elongate restraining member 40 but the bias 38 will maintain the valve poppet 20 in the closed position and the pressure of the fluid F will not be relieved. Hence, in order for the thermo restrained fluid pressure relief device 12 to be effective to relieve pressure of the fluid F, it is required that a combination of predetermined temperature and pressure conditions exist substantially simultaneously.

While the fluid pressure relief device 12 has been described, disclosed, illustrated and shown as employing a thermo responsive means or structure 46 which in the preferable modification or embodiment has the configuration of the disc 48, it is to be understood that other configurations may be employed to effectively enable the release of the restraining member 40.

Also, it is believed that other types of thermo responsive means, such as thermostats in the form of bellows and sylphons, may be employed in the structure 46 in place of the discs 48.

Further, while a pair of linkage assemblies 52 and structure 46 have been described, disclosed, illustrated and shown, it is possible that only a single linkage assembly 52 and a single structure 46 may be effective in order to accomplish the desired result for the vessel 10 under certain conditions.

In the same manner, while the restraining member 40 has been shown in the preferable modification or embodiment as having the configuration of a bar-like element, it is to be understood that other configurations may be satisfactory and operably employed.

It should also be noted that this invention is not intended to be restricted or limited to aircraft tires only. For example, there is also a similar problem with commercial vehicle tires when used in tandem. If for some reason, one of the tandem tires goes soft, the other tire of the pair begins to overheat due to the increased load imposed thereon. The subsequent increase of the temperature and fluid pressure on the other tire leads to the deterioration of the tire casing and eventual rupturing and the subsequent loss of both tires, plus the inherent danger to the vehicle.

The fluid pressure relief device 12 is also suitable for any application which requires the pressure relief of a fluid which is restrained until a condition of temperature, either rise or fall, exists simultaneously with an excess of fluid pressure. It is not intended that this invention be limited to use in tires only, but may be used in any vessel such as a boiler, compressed gas cylinders, etc., containing any fluid under pressure such as steam, gas or liquids.

For example, it may be desired that the pressure of the fluid F, which is confined within the vessel 10, should be relieved after a decrease or temperature drop rather than a temperature rise and accordingly, under these conditions, it is only necessary that the structure 46 have the discs 48 disposed in a reversed position to that as illustrated in the drawing so that the discs 48 will bear against the respective linkage assembly 52 when the temperature condition falls below a predetermined value.

Similarly, the predetermined values or conditions may be set below what might be considered to be the normal operating values or conditions since in certain instances, for example, a tire casing, which has deteriorated because of excessive heat and, accordingly, is no longer safe during operations under normal values or conditions, may possibly be operable under conditions which are below the normal operating values or conditions.

In addition, a flag, a whistle, or pressure sensitive electrical switch, not illustrated, may be used in the exhaust path of the fluid to give visual, audible or electrical indication of the functioning of the device.

While the invention has been described in terms of an embodiment or modification which it has assumed in practice, the scope of the invention should not be deemed to be limited by the precise embodiment or modification herein shown, such other embodiments or modifications being intended to be reserved especially as they fall within the scope of the claims herein appended.

I claim as my invention:

1. A device for relieving pressure of a fluid confined in a vessel,
    said device being response to certain combined predetermined temperature and pressure values and comprising
    a body having a chamber,
    fluid pressure responsive valve structure disposed within the chamber of the body for relieving the pressure of such fluid when said certain predetermined pressure value occurs,
    occurs,
    retraining structure carried by said body for restraining said valve structure against relieving the pressure of such fluid when said certain predetermined pressure value exists, and
    thermo-responsive structure carried by said body for releasing the restraining structure when said certain predetermined temperature value occurs.

2. The structure as set forth in claim 1 wherein such vessel comprises
    a wheel assembly including a rim having a pneumatic tire mounted thereon.

3. The structure as set forth in claim 2 wherein such wheel assembly is for an aircraft.

4. In combination wtih an aircraft wheel assembly comprising a pneumatic tire casing having a desired fluid pressure,
    a device for relieving such fluid pressure in response to the combination of certain predetermined temperature and fluid pressure conditions of the wheel assembly,
    said device having a body provided with a chamber in communication with the tire casing,
    said device comprising fluid pressure responsive structure disposed within the chamber of the body for relieving the pressure of such fluid when said certain predetermined fluid pressure condition occurs,
    retraining structure carried by the body of the device for restraining said fluid pressure responsive structure against relieving the pressure of such fluid when said certain predetermined fluid pressure condition exists, and thermo-responsive structure carried by the body of the device for releasing the restraining structure when said predetermined temperature condition occurs.

5. The structure as set forth in class 4 wherein said fluid pressure responsive structure comprises
   valve structure and
   a bias normally urging said valve structure to a position for effectively preventing flow of such fluid from within the pneumatic tire casing to atmosphere.

6. The structure as set forth in claim 5 wherein said restraining structure comprises
   a member for maintaining the valve structure in the fluid flow preventing position.

7. The structure as set forth in claim 5 wherein said thermo-responsive structure comprises
   at least one bi-metallic element for releasing the restraining structure to enable the valve structure to move from the fluid flow preventing position to a position which enables the fluid to flow from within the pneumatic tire casing to atmosphere.

8. The structure as set forth in claim 5 wherein said thermo-responsive structure comprises
   a linkage assembly for releasing the restraining structure to enable the valve structure to move from the fluid flow preventing position to a position to enable such fluid flow from within the confines of the pneumatic tire casing to atmosphere.

9. In combination with a pneumatic tire casing having a fluid confined therein under a desired fluid pressure,
   a device for releasing such fluid pressure in response to the combination of certain predetermined temperature and fluid pressure conditions of the tire casing,
   said device having a body provided with a chamber in communication with the tire casing,
   said device comprising fluid pressure responsive valve structure disposed within the chambers of the body for releasing the pressure of such fluid when said certain predetermined pressure condition occurs,
   a bias normally urging said valve structure to a position for effectively preventing flow of such fluid from within the confines of the tire casing,
   restraining structure carried by the body of the device for restraining said valve structure against movement from said position,
   said restraining structure comprising a member supported by said valve structure and movably relative thereto from a position which maintains the valve structure in the said fluid flow preventing position to a second position which enables the valve structure to move from the said fluid flow position when said certain predetermined pressure condition exists, and
   thermo-responsive structure carried by the body of the device for releasing the restraining structure when said certain predetermined temperature condition occurs,
   said thermo-responsive structure comprising at least one bi-metallic element and a linkage assembly pivotally disposed intermediate the bimetallic element and the member of the restraining structure and operable on engagement by the bi-metallic element to move the member to release the valve structure when said predetermined temperature value exists.

10. The structure as set forth in claim 9 wherein said device is disposed substantially entirely within the confines of the pneumatic tire casing.

11. The structure as set forth in claim 9 together with a connection between the bi-metallic element and the linkage assembly to enable the thermo-responsive structure to be reset.

12. A fluid pressure relief device comprising
    a body having a chamber,
    valve structure disposed within said chamber, said valve structure being responsive to a predetermined fluid pressure condition to relieve pressure of a fluid confined within a vessel,
    restraining structure carried by said body for restraining said valve structure against release of fluid pressure when said predetermined fluid pressure condition occurs, and
    release structure carried by said body, said release structure being responsive to a predetermined temperature condition for releasing the restraining structure to enable fluid pressure to be relieved.

References Cited by the Examiner
UNITED STATES PATENTS

| 886,945 | 5/1908 | Clarke | 236—92 |
|---|---|---|---|
| 1,916,696 | 7/1933 | Stewart | 236—61 |
| 2,538,221 | 1/1951 | Wilber | 137—79 X |
| 2,925,799 | 2/799 | Caldwell | 152—418 X |

M. CARY NELSON, *Primary Examiner.*

ISADOR WEIL, *Examiner.*

D. ROWE, H. KLINKSIEK, *Assistant Examiners.*